(12) United States Patent
Bröcker et al.

(10) Patent No.: US 6,297,415 B1
(45) Date of Patent: *Oct. 2, 2001

(54) CATALYTIC DISTILLATION PROCESS

(75) Inventors: Franz Josef Bröcker, Ludwigshafen; Klemens Flick, Herxheim; Cristina Freire Erdbrügger, Bobenheim-Roxheim; Gerd Kaibel, Lampertheim; Gerald Meyer, Ludwigshafen; Hans-Joachim Müller, Grünstadt; Peter Polanek, Weinheim; Ekkehard Schwab, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/202,474

(22) PCT Filed: Jun. 16, 1997

(86) PCT No.: PCT/EP97/03122

§ 371 Date: Jun. 24, 1999

§ 102(e) Date: Jun. 24, 1999

(87) PCT Pub. No.: WO97/48466

PCT Pub. Date: Dec. 24, 1997

(30) Foreign Application Priority Data

Jun. 17, 1996 (DE) .............................. 196 24 130

(51) Int. Cl.[7] .............................. C07C 5/02; C07C 7/167

(52) U.S. Cl. .................. 585/260; 585/262; 585/275; 203/29; 203/DIG. 6

(58) Field of Search ................. 585/260, 262, 585/275; 203/DIG. 6, 29

(56) References Cited

U.S. PATENT DOCUMENTS

| | | | |
|---|---|---|---|
| 4,242,530 | 12/1980 | Smith, Jr. | 585/510 |
| 4,443,559 | 4/1984 | Smith, Jr. | 502/527 |
| 4,731,229 | 3/1988 | Sperandio | 422/188 |
| 5,162,288 | 11/1992 | Stringaro | 502/439 |
| 5,470,542 | 11/1995 | Stringaro | 422/211 |
| 5,866,734 | * 2/1999 | Flick et al. | 585/260 |

FOREIGN PATENT DOCUMENTS

| | | |
|---|---|---|
| 068862 | 1/1983 | (EP) . |
| 201614 | 11/1986 | (EP) . |
| 433223 | 6/1991 | (EP) . |
| 556025 | 8/1993 | (EP) . |
| 631813 | 1/1995 | (EP) . |

* cited by examiner

Primary Examiner—Bekir L. Yildirim
(74) Attorney, Agent, or Firm—Keil & Weinkauf

(57) ABSTRACT

A catalyst packing which can be produced by vapor deposition and/or sputtering of at least one substance active as catalyst and/or promotor onto woven or knitted fabrics or sheets as support material is used in a process for catalytic distillation in which a heterogeneously catalyzed reaction is combined with a simultaneous distillation or rectification over the catalyst packing.

13 Claims, No Drawings

CATALYTIC DISTILLATION PROCESS

The present invention relates to a process for catalytic hydrogenation in which a heterogeneously catalyzed hydrogenation is combined with a distillation or rectification over a catalyst packing. The invention further relates to the use of a catalyst packing in processes for catalytic distillation.

The catalytic reaction of materials with simultaneous distillative separation of the reaction products is widely employed in the refinery sector, with cracker streams being selectively hydrogenated and separated.

EP-A1-0 556 025 relates to the selective hydrogenation of $C_5$ streams. The selective hydrogenation of a $C_5$ stream for preparing tert-amyl methyl ether (TAM) is described. Little to no saturation of the monoolefins occurs during the hydrogenation. Part of the monoolefins in the stream is isomerized. Diolefins are hydrogenated to monoolefins by passing a stream of light naphtha and hydrogen over a distillation structure which contains a catalyst comprising palladium oxide on aluminum oxide. Here, the catalyst is present in a plurality of pockets made of woven fabric which is held in a helical arrangement by means of a framework of open-meshed steel wire braid. The woven fabric used is preferably woven fiberglass fabric or teflon.

U.S. Pat. No. 4,443,559 relates to a catalytic distillation structure. The structure serves both as catalyst and as distillation packing. In the structure, the catalytic material having a particle size in the range from 0.25 to 1 mm is present in porous containers such as containers of woven fabric, wire mesh or woven polymer fabrics. These catalyst pockets are arranged in a matrix in such a way that at least 70% by volume of free space remains so that the catalyst bed can expand and contract. A plurality of catalytic reactions is indicated.

U.S. Pat. No. 4,242,530 relates to a process for separating isobutene from $C_4$ streams. The isobutene is catalytically polymerized or dimerized and separated off from the bottoms of the column. The distillation column is charged with an acid catalyst on a support. The catalyst is enclosed in pockets of woven fabric which are in turn surrounded by an open-mesh knitted fabric of steel wire. This wire mesh forms the support of the catalyst and allows the passage of the steam through the catalyst pockets. In particular, use is made of an acid cation-exchange fixed-bed catalyst.

EP-A1-0 631 813 relates to a catalytic fixed-bed reactor. The fixed-bed reactor contains stacked packing elements which form cushion-like packing parts having walls permeable to the distillation medium. These closed cushion-like packing parts contain the catalyst in the form of granules. The granules are introduced into the packing elements, for example, from above via a vibrating apparatus.

EP-B1-0 201 614 relates to a reactor for carrying out heterogenous, catalyzed chemical reactions. The catalyst here comprises corrugated plates arranged parallel to the main flow axis of the reactor, the corrugation being inclined at an angle to the main flow axis and being aligned in opposite directions in adjacent plates. A band-like, at least partially corrugated catalyst body is inserted in such a way that it can be removed between adjacent plates. The catalyst body can here be made, for example, of glass metal, woven wire fabric or knitted wire fabric. The catalyst body can consist entirely of a catalytically active material or be catalytically activated on the surface.

EP-B1-0 068 862 relates to a packing module for a catalyst having an ordered bed. The catalyst bed comprises alternate layers of flat and corrugated sheets which are rolled out into a roll. The bed has passages for fluid between the flat and corrugated sheets.

The flat sheet comprises a woven, knitted or felted cloth of a wick-like textile material which is hydrophilic in respect of the liquid in a gas-liquid transfer reaction to be carried out. The corrugated sheet comprises an open-mesh material which is hydrophobic in respect of the liquid and can comprise catalyst crystallites of at least one element of group VIII of the Periodic Table. The crystallites are here dispersed in the porous matrix and are partially enclosed so that the porous matrix essentially blocks contact of the liquid with the crystallites but makes possible contact with the gas under liquid in vapor form. Matrices of this type which are described are polytetrafluoroethylane with a catalyst comprising platinum crystallites which are supported on carbon particles having a high surface area. The catalytically active Pt/C particles are applied in the form of an aqueous suspension of Pt/C powder to the hydrophobic polymer and fixed by drying at from 60° C. to 200° C. and subsequent sintering at 365° C. As gas-liquid transfer reaction, mention is made of the hydrogen isotope exchange between hydrogen and liquid water.

EP-B1-0 433 223 relates to catalyst bodies and a reactor for carrying out a reaction heterogeneously. The catalyst body here has a support structure in the form of static mixer elements which are formed of a metal skeleton or can comprise a ceramic layer. A washcoat is applied to this support structure. The actual catalyst is located on the surface of the washcoat. The support structure can consist of one piece. Specific heterogeneous, catalytic reactions are not described.

Mechanical stressing of washcoated catalyst bodies tends to result in destruction of the applied layers which can become detached owing to inadequate adhesive strength.

In the case of the catalysts having granulated catalyst beds in packing elements such as woven fabric pockets, abrasion occurs particularly during charging of the catalytic distillation apparatus and when bumps occur during operation addition, higher pressure drops occur in beds than in the surroundings which leads to poor radial mixing in the reactor, to inhomogeneous concentration profiles and frequently to undesired leakage past the catalyst.

It is an object of the present invention to provide a catalyst for catalytic distillation in which a heterogeneously catalyzed reaction is combined with a distillation or rectification over a catalyst packing. A further object of the invention is the provision of a suitable catalyst system for catalytic distillation which avoids the disadvantages mentioned above. A further object of the invention is the provision of a reactor for catalytic distillation in which the catalyst packing can easily be changed. Another object of the invention is the provision of a process for catalytic hydrogenation.

We have found that these objects are achieved by the use of a catalyst packing which can be produced by vapor deposition and/or sputtering of at least one substance active as catalyst and/or promotor onto woven or knitted fabrics or sheets as support material in a process for catalytic distillation in which a heterogeneously catalyzed reaction is combined with simultaneous distillation or rectification over the catalyst packing. Preferred embodiments are indicated in the subclaims. In addition, the objects are achieved by a reactor for catalytic distillation, which reactor comprises a distillation column which is packed with a catalyst packing as described above. Furthermore, the objects are achieved by a process for catalytic hydrogenation using the catalyst packing.

Support Material

As support material for the catalysts used according to the present invention, it is possible to use a variety of sheets and woven or knitted fabrics, as well as knitted fabrics. Suitable woven wire fabrics are, according to an embodiment of the invention, woven fabrics of weavable metal wires such as iron, spring steel, brass, phosphor bronze, pure nickel, Monel, aluminum, silver, nickel silver, nickel, nichrome, chromium steel, stainless, acid-resistant and highly heat-resistant chromium nickel steels or titanium.

It is likewise possible to use woven fabrics of inorganic materials such as $Al_2O_3$ and/or $SiO_2$.

Synthetic wires and woven fabrics of plastics can also be used according to an embodiment of the invention. Examples are polyamides, polyesters, polyvinyls, polyolefins such as polyethylene, polypropylene, polytetrafluoroethylene and other plastics which can be processed into woven fabrics.

Preferred support materials are metal sheets or woven metal fabrics, for example stainless steels having the material numbers 1.4767, 1.4401, 2.4610, 1.4765, 1.4847, 1.4301 etc. The designation of these materials with said material numbers follows the material numbers given in "Stahleisenliste", published by the Verein Deutscher Eisenhüttenleute, 8th edition pages 87, 89 and 106, Verlag Stahleisen mbH, Düsseldorf, 1990. The material having the material number 1.4767 is also known under the name Kanthal.

The metal sheets and woven metal fabrics are particularly suitable since they can be roughened by surface heating before being coated with catalytically active compounds or promoters. For this purpose, the metal supports are heated at from 400 to 1100° C., preferably from 800 to 1000° C., for from 0.5 to 24 hours, preferably from 1 to 10 hours, in an oxygen-containing atmosphere such as air. According to an embodiment of the invention, the activity of the catalyst can be controlled or increased by this pretreatment.

Coating of the Catalyst Support

The catalyst supports which can be used according to the present invention, in particular the woven or knitted fabrics and sheets, can be coated with "thin layers" of catalytically active compounds and promoters by means of a vacuum vapor deposition technique. "Thin layers" mean coatings having a thickness range from a few Å ($10^{-10}$ m) to at most 0.5 μm. According to the present invention, various processes can be employed as vacuum vapor deposition techniques. Examples are thermal vaporization, flash vaporization, cathode atomization (sputtering) and the combination of thermal vaporization and cathode atomization. The thermal vaporization can be carried out by means of direct or indirect electric heating.

Vaporization by means of an electron beam can likewise be used according to the present invention. For this purpose, the substance to be vaporized is placed in a water-cooled crucible and heated on the surface by means of an electron beam to such a temperature that even high-melting metals and dielectrics are vaporized. According to an embodiment of the invention, chemical reactions during the layer buildup by vapor deposition techniques can be effected by targeted additions of suitable amounts of reactive gases to the residual gas. Oxides, nitrides or carbides can thus be produced on the support by means of an appropriate reaction procedure.

The process of the present invention enables the supports, in particular the woven or knitted fabrics and sheets, to be coated discontinously or continuously in a vacuum vapor deposition unit. For example, the vapor deposition is carried out by heating the catalytically active component or compound to be applied, for example a noble metal, in a vacuum of from $10^{-2}$ to $10^{-10}$ torr, preferably from $10^{-4}$ to $10^{-8}$ torr, by means of an electron beam to such a temperature that the metal is vaporized from the water-cooled crucible and deposits on the support. The woven support fabric is advantageously arranged in such a way that as great as possible a part of the vapor stream condenses on the support. The woven oder knitted fabrics and sheets can be coated continuously by means of a built-in winder. According to the present invention, preference is given to continuous sputtering in an air-to-air unit.

Suitable parameters and conditions for vacuum vapor deposition techniques may be found, for example, in "Handbook of Thin Film Technology", Maissel and Glang, McGraw Hill, N.Y. 1970, "Thin Film Processes" by J. L. Vossen and B. Kern, Academic Press, N.Y. and in EP-A2-0 198 435. EP-A2-0 198 435 describes the production of a catalyst mesh packet by vapor deposition of platinum or platinum and rhodium onto woven stainless steel fabrics.

In the production according to the present invention of the catalysts by vacuum vapor deposition techniques, the particles produced on the support should be as far as possible unordered and disrupted polycrystalline particles in which most of the atoms are present on the surface. It differs in this way from the known vapor deposition techniques in the optical and electronics industries in which a high purity of the substrate and vapor-deposited materials has to be ensured and a predetermined condensation temperature on the substrate as well as a certain vapor deposition rate have to be set.

In the process of the present invention, one or more catalytically active compounds or promoters can be vapor deposited.

According to an embodiment of the invention, the coatings preferably have thicknesses in the range from 0.2 nm to 100 nm, particularly preferably from 0.5 nm to 20 nm.

According to an embodiment of the invention, the elements of transition groups I and/or VII and/or VII of the Periodic Table of the Elements are used as catalytically active compounds. According to the present invention, promoters can be selected, for example, from among the elements of main groups IV, V and VI and of transition groups II, III, VI and VII of the Periodic Table of the Elements.

According to an embodiment of the invention, rare earth metals are used as promoters.

Examples of catalytically active elements for the purposes of the present invention are copper, silver, gold, rhenium, ruthenium, cobalt, rhodium, nickel, palladium and/or platinum and also mixtures of these. Examples of promoters are lead, tin, silicon, zinc, cadmium, titanium, zirconium and mixtures thereof.

The coated support material can be heat-treated after coating, for example in the case of a palladium-coated support material at from 200 to 800° C., preferably from 300 to 700° C., for from 0.5 to 2 hours.

After the production of the catalyst, it can, if desired or necessary, be reduced with hydrogen at from 20 to 250° C., preferably from 100 to 200° C. This reduction can also, preferably, be carried out in the reactor itself.

In place of a promoter, it is also possible to vapor deposit an inhibitor if this is required for the respective catalytic distillation.

According to an embodiment of the invention, the catalysts can be built up systematically, for example in a vapor deposition unit having a plurality of different vaporization sources. Thus, for example, an oxide layer or, by reactive vaporization, a binding layer can be applied first to the support. Onto this base layer it is possible to vapor deposit catalytically active components and promoters in a plurality of alternating layers. Introducing a reactive gas into the receivers in the vapor deposition makes it possible to produce promoter layers comprising oxides and other compounds. Heating steps can also be carried out in between or afterwards.

The catalysts produced according to the present invention by vapor deposition, in particular woven or knitted catalyst fabrics and catalyst sheets, have a very good adhesion of the catalytically active compounds or promoters. They can therefore be shaped, cut and, for example, made into monolithic catalyst elements without the catalytically active compounds or promoters becoming detached. From the woven or knitted catalyst fabrics and catalyst sheets of the present invention it is possible to produce catalyst packings of any shape for a reaction column or distillation column. Catalyst packing elements having different geometries as are known from distillation and extraction technology can be produced. Examples of advantageous catalyst packing geometries according to the present invention which offer the advantage of a low pressure drop in operation are those of the types Montz A 3 and Sulzer BX, DX and EX. An example of a catalyst geometry according to the present invention comprising catalyst sheets or expanded metal catalyst sheets are those of the type Montz BSH.

The amount of catalyst, in particular amount of woven or knitted catalyst fabric or amount of catalyst sheet, incorporated per unit volume can be controlled within a wide range, giving different sizes of openings or channel widths in the woven or knitted catalyst fabric or in the catalyst sheet. Appropriate selection of the amount of woven or knitted catalyst fabric or catalyst sheet per unit volume enables the maximum pressure drop in the distillation reactor to be adjusted and the catalyst can thus be matched to requirements determined by experiment.

Preferably, the catalyst used according to the present invention is in the form of a monolith as is described, for example, in EP-A2-0 564 830. Further suitable catalysts are described in EP-A1-0 218 124 and EP-A-1-0 412 415.

Catalytic Distillation

The catalyst packings of the present invention can be used in catalytic distillation reactions. By setting the catalyst density per unit volume by appropriate shaping of the catalyst packing, for instance into monoliths, the desired pressure profile in the catalytic distillation apparatus can be set. The desired measure of reactivity of the catalyst can be set for the respective reaction by means of the amount of the vapor-deposited catalytically active compounds or promoters or inhibitors. The catalytic reaction is carried out over a catalyst packing as described above during a distillation or rectification of the reaction mixture taking place simultaneously.

For the purposes of the present invention, "catalytic distillation" is a chemical reaction which is combined with a distillation or rectification in a suitable apparatus. The reaction and also the distillation or rectification take place essentially simultaneously over a heterogeneous catalyst packing which catalyzes the chemical reaction. In the chemical reaction, chemical compounds are converted into other chemical compounds over the catalyst packing, for example by uptake of other chemical compounds, for instance by uptake of hydrogen in hydrogenation. The chemical reaction over the catalyst packing proceeds heterogeneously. The chemical reaction proceeds with at least one component present in the reaction mixture during the reaction being distilled off from the reaction mixture during or immediately after the reaction. Thus, a chemical reaction and a material separation occur simultaneously. The reaction products formed in the chemical reaction can be distilled off or be obtained in the bottoms from the distillation.

According to an embodiment of the invention, two different chemical compounds are reacted over the catalyst packing to form at least one further chemical compound. This is the case, for example, in hydrogenation.

Catalytic Hydrogenation

The invention also provides a process for hydrogenation. The hydrogenation is here carried out during a distillation or rectification of a hydrogenation mixture taking place simultaneously in a catalyst packing as described above.

Reactor

The invention likewise provides a reactor for catalytic distillation comprising a distillation column which is packed with a catalyst packing as described above. This reactor can be used for the above-described reactions. It has the advantages that no abrasion of the catalyst packing occurs during charging and during operation of the reactor, that the catalyst packings can be changed simply and that it is possible to operate the reactor with a minimal pressure drop.

The invention is illustrated by the examples below.

EXAMPLE 1

Plain woven wire fabric made of the material no. 1.4767 and having a mesh opening of 0.18 mm and a wire diameter of 0.112 mm was heated in air at 900° C. for 5 hours. Subsequently, the support fabric thus treated had 6 nm of palladium vapor deposited on it on both sides in an electron beam vapor deposition unit. The thickness of the layer was measured by means of a crystal oscillator and the vapor deposition rate was controlled by means of the crystal oscillator. The amount of palladium deposited was 138 mg/m$^2$. Monolithic bodies were formed from this woven catalyst fabric. For this purpose, part of the woven fabric was corrugated by means of a corrugated roller. This corrugated woven fabric was laid together with smooth woven fabric and rolled up. This gave monolithic shaped bodies which were strengthened by point welding.

2 catalyst monoliths each having a length of 20 cm and a diameter of 2 cm were made from 0.112 m$^2$ of woven catalyst fabric and installed at a woven fabric density of 1.79m$^2$/l, corresponding to 0.247 g of Pd/l, in a catalytic distillation apparatus.

EXAMPLE 2

A smooth woven stainless steel fabric (material no. 1.4767) having a mesh opening of 180 μm and a wire diameter of 110 μm was cleaned in an ultrasonic bath and subsequently heated in air at 900° C. for 7 hours. A 20° cm wide woven fabric strip was set up on the winder installed in an ultra high vacuum vapor deposition unit and subsequently had 2 nm of Pd vapor deposited on it continuously at a pressure of 10$^{-6}$ mbar. By winding back the woven fabric, this was coated with 0.7 nm of Bi in a second vapor deposition step. After the vapor deposition, the catalyst intermediate was activated at 600° C. for 30 minutes in an electric muffle furnace. For this purpose, the furnace was heated to 600° C. over a period of 40 minutes, held at this temperature for 30 minutes and then switched off. After cooling, the catalyst was taken from the muffle furnace and formed into a monolith For this purpose, 41.5 cm of smooth woven fabric was corrugated by means of a corrugated roller and laid together with 38 cm of smooth woven fabric and rolled up. This gave a monolithic catalyst having a volume of 67 cm$^3$.

We claim:

1. A process for catalytic distillation in which a heterogeneously catalyzed reaction is combined with simultaneous distillation or rectification over a catalyst packing, wherein said catalyst packing is produced by vapor deposition and/or sputtering of at least one substance active as catalyst and/or promotor onto woven or knitted fabrics or sheets as support material.

2. A process as claimed in claim 1, wherein the catalyst packing comprises at least one monolith made from the woven or knitted fabric or the sheet which are in the form of a band.

3. A process as claimed in claim 1, wherein the woven or knitted fabric or the sheet comprises stainless steel.

4. A process as claimed in claim 1, wherein the woven or knitted fabric or the sheet is heated at from 400 to 1100° C., for from 0.5 to 24 hours, in an oxygen-containing atmosphere prior to the vapor deposition and/or sputtering.

5. A process as claimed in claim 1, wherein the woven or knitted fabric or the sheet comprises inorganic material or plastic.

6. A process as claimed in claim 1, wherein the catalytically active substances are selected from among the elements of transition groups I and/or VII and/or VIII and/or the promoters are selected from among the elements of main groups IV, V and VI and transition groups II, III, VI and VII of the Periodic Table of the Elements.

7. A reactor for catalytic distillation in which a heterogeneously catalyzed reaction is combined with a distillation or rectification over a catalyst packing, comprising a distillation column which is packed with a catalyst packing as described in claim 1.

8. A method of use of a catalyst packing which is produced by vapor deposition and/or sputtering of at least one substance active as catalyst and/or promotor onto woven or knitted fabrics or sheets as support material in a process for catalytic distillation in which a heterogeneously catalyzed reaction is combined with simultaneous distillation or rectification over the catalyst packing, comprising the step of reacting two different chemical compounds over the catalyst packing to form at least one further chemical compound.

9. A method of use as claimed in claim 8, wherein the catalyst packing comprises at least one monolith made from the woven or knitted fabric or the sheet which are in the form of a band.

10. A method of use as claimed in claim 8, wherein the woven or knitted fabric or the sheet comprises stainless steel.

11. A method of use as claimed in claim 8, wherein the woven or knitted fabric or the sheet is heated at from 400 to 1100° C., for from 0.5 to 24 hours, in an oxygen-containing atmosphere prior to the vapor deposition and/or sputtering.

12. A method of use as claimed in claim 8, wherein the woven or knitted fabric or the sheet comprises inorganic material or plastic.

13. A method of use as claimed in claim 8, wherein the catalytically active substances are selected from among the elements of transition groups I and/or VII and/or VIII and/or the promoters are selected from among the elements of main groups IV, V and VI and transition groups Il, III, VI and VII of the Periodic Table of the Elements.

* * * * *